US011960838B2

(12) United States Patent
Kim et al.

(10) Patent No.: US 11,960,838 B2
(45) Date of Patent: Apr. 16, 2024

(54) METHOD AND DEVICE FOR REINFORCEMENT OF MULTIPLE CHOICE QA MODEL BASED ON ADVERSARIAL LEARNING TECHNIQUES

(71) Applicant: 42Maru Inc., Seoul (KR)

(72) Inventors: Dong Hwan Kim, Seoul (KR); Han Su Kim, Gyeonggi-do (KR); Woo Tae Jeong, Gyeonggi-do (KR); Ki Bong Sung, Seoul (KR); Hyeon Dey Kim, Gyeonggi-do (KR)

(73) Assignee: 42Maru Inc., Seoul (KR)

( * ) Notice: Subject to any disclaimer, the term of this patent is extended or adjusted under 35 U.S.C. 154(b) by 0 days.

(21) Appl. No.: 17/120,075

(22) Filed: Dec. 11, 2020

(65) Prior Publication Data

US 2022/0180061 A1   Jun. 9, 2022

(30) Foreign Application Priority Data

Dec. 3, 2020   (KR) .................. 10-2020-0167224

(51) Int. Cl.
*G06F 40/279*   (2020.01)
*G06F 40/35*   (2020.01)
*G06N 3/08*   (2023.01)

(52) U.S. Cl.
CPC ............ *G06F 40/279* (2020.01); *G06F 40/35* (2020.01); *G06N 3/08* (2013.01)

(58) Field of Classification Search
CPC ...... G06F 40/30; G06F 16/3329; G06F 40/35; G06F 40/279; G09B 7/06; G09B 7/08; G06N 3/08
See application file for complete search history.

(56) References Cited

U.S. PATENT DOCUMENTS 11,250,332 B2 *   2/2022   Akolkar .............. G06F 16/3329
2015/0348433 A1 *   12/2015   Gatterbauer .......... G06Q 10/101
434/353
(Continued)

FOREIGN PATENT DOCUMENTS

KR   10-2019-0059084   5/2019

OTHER PUBLICATIONS

Liang et al , "Distractor Generation with Generative Adversarial Nets for Automatically Creating Fill in the blank Questions", published: 2017, pp. 1-4 (Year: 2017).*

(Continued)

*Primary Examiner* — Wilson W Tsui
(74) *Attorney, Agent, or Firm* — Sughrue Mion, PLLC

(57) ABSTRACT

The present invention relates to a method for reinforcing a multiple-choice QA model based on adversarial learning techniques, wherein incorrect answers are further generated based on a data set used in the process of training the multiple-choice QA model to enrich data which are learnable by the multiple-choice QA model. To achieve this object, the method includes step A of an incorrect answer generation model encoding a text based on natural language text and a question, generating a second incorrect answer based on the text and the question, and transmitting the second incorrect answer to an incorrect answer test model, step B of the incorrect answer test model encoding the text, the question, a first correct answer corresponding to the text and the question, a first incorrect answer and the second incorrect answer, and selecting a second correct answer based on results of the encoding, step C of the incorrect answer test model generating a feedback by determining whether the first correct answer is identical to the second correct answer, and step D of the incorrect answer genera- (Continued)

tion model and the incorrect answer test model performing self-learning based on the feedback.

14 Claims, 2 Drawing Sheets

(56) References Cited

U.S. PATENT DOCUMENTS

| | | | | |
|---|---|---|---|---|
| 2016/0293034 | A1* | 10/2016 | Agarwalla | G06N 20/00 |
| 2018/0373791 | A1* | 12/2018 | Yen | G06F 16/367 |
| 2020/0265735 | A1* | 8/2020 | Byron | G09B 5/08 |
| 2020/0388184 | A1* | 12/2020 | Sarir | G09B 7/077 |

OTHER PUBLICATIONS

Mitchell Kinney, "Multiple Choice Question Answering using a Large Corpus of Information", published: Jul. 2020, pp. C1, C2, i-viii, and 1-110 (Year: 2020).*

Alfredo Canziani, "Generative Adverarial Networks", Publisher: wayback machine, pp. 1-6 (Year: 2020).*

Bao, et al. "Question Generation With Doubly Adversarial Nets", IEEE/ACM Transactions on Audio, Speech, and Language Processing, vol. 26, No. 11, Nov. 1, 2018, pp. 2230-2239.

Barz, et al. "Incremental Improvement of a Question Answering System by Re-ranking Answer Candidates using Machine Learning", arxiv.org, arXiv:1908.10149, Aug. 27, 2019.

Chao, et al. "Cross-Dataset Adaptation 1-11 for Visual Question Answering", 2018 IEEE/CVF Conference on Computer Vision and Pattern Recognition, IEEE, Jun. 18, 2018, pp. 5716-5725.

Extended European Search Report dated Aug. 4, 2021 for EP20213257, 12 pages.

Offerijns, et al. "Better Distractions: Transformer-based Distractor Generation and Multiple Choice Question Filtering", arxiv.org, arXiv:2010.09598, Oct. 19, 2020.

Park, et al. "Korean Learning Assistant System with Automatically Extracted Knowledge." KIPS Transactions on Software and Data Engineering, vol. 1, No. 2, Nov. 2012, pp. 91-102, with English Abstract.

* cited by examiner

METHOD AND DEVICE FOR REINFORCEMENT OF MULTIPLE CHOICE QA MODEL BASED ON ADVERSARIAL LEARNING TECHNIQUES

BACKGROUND OF THE INVENTION

Field of the Invention

The present invention relates to a method and device for reinforcing a multiple-choice QA model based on adversarial learning techniques, and in more detail, a method and device for performing negative sampling on a multiple-choice QA question through an incorrect answer generation model to reinforce a process of training the multiple-choice QA model.

Description of the Related Art

MRC (Machine Reading Comprehension) and QA (Question Answering) is one of the fundamental tasks for natural language understanding. Due to the increased complexity of deep neural networks and the transfer of knowledge from the language models pre-trained on large-scale corpora, state-of-the-art QA models have achieved human-level performance. However, in the case of a multiple-choice question, the existing extraction-type question-answering system is less accurate and needs to improve performance.

SUMMARY OF THE INVENTION

The present invention is to solve the above-described problem, and an object of the present invention is to further generate an incorrect answer based on a data set used in a process of training a multiple-choice QA model to enrich data which can be learned by the multiple-choice QA model to reinforce the multiple-choice QA model.

The invention for achieving the object is a method for reinforcing a multiple-choice QA model based on adversarial learning techniques including: step A of an incorrect answer generation model encoding a text based on natural language text and a question, generating a second incorrect answer based on the text and the question, and transmitting the second incorrect answer to an incorrect answer test model; step B of the incorrect answer test model encoding the text, the question, a first correct answer corresponding to the text and the question, a first incorrect answer, and the second incorrect answer, and selecting a second correct answer based on results of the encoding; step C of the incorrect answer test model generating a feedback by determining whether the first correct answer is identical to the second correct answer; and step D of the incorrect answer generation model and the incorrect answer test model performing self-learning based on the feedback.

Further, the invention is a system for reinforcing a multiple-choice QA model based on adversarial learning techniques including: an incorrect answer generation model configured to encode a text based on natural language text and a question, generate a second incorrect answer based on the text and the question, receive a second feedback corresponding to the second incorrect answer received from an incorrect answer test model and adjust a weight, and an incorrect answer test model configured to encode the text, the question, a first correct answer corresponding to the text and the question, a first incorrect answer, and the second incorrect answer, select a second correct answer based on results of the encoding, generate a first feedback and a second feedback by determining whether the first correct answer is identical to the second correct answer, and adjust a weight based on the first feedback.

DETAILED DESCRIPTION OF THE PREFERRED EMBODIMENTS

Figure 1:
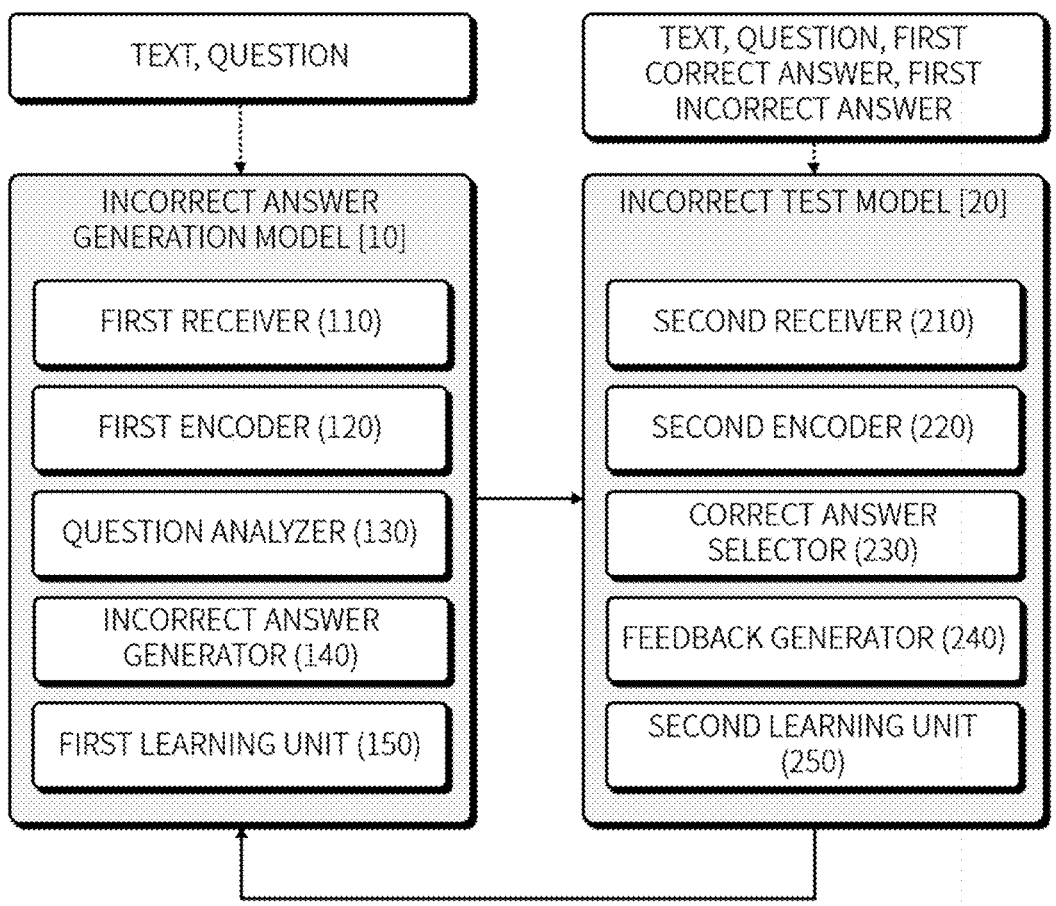
FIG. 1 is a block diagram illustrating a configuration of a system for reinforcing a multiple-choice QA model based on an adversarial learning technique according to an embodiment of the present invention.

The above-described objects, features, and advantages will be described in detail below with reference to the accompanying drawings, and accordingly, a person skilled in the art to which the present invention pertains can easily implement the technical spirit of the present invention. In describing the present invention, when it is determined that the detailed description of the known technology related to the present invention may unnecessarily obscure the gist of the present invention, the detailed description thereof will be omitted.

In the drawings, the same reference numerals are used to indicate the same or similar elements, and all combinations described in the specification and claims may be combined in any manner. It should be understood that reference to the singular may include more than one, and reference to the singular may also include the plural.

The terms used in this specification are for the purpose of describing specific exemplary embodiments only and are not intended to be limiting. Singular expressions as used herein may also be intended to include plural meanings unless clearly indicated otherwise in the corresponding sentence. The term "and/or" includes all combinations and any of the items listed in connection therewith. The terms "comprises", "comprising", "including", "having" and the like have inclusive meanings, and accordingly, these terms specify features, integers, steps, operations, elements, and/or components, and does not exclude the presence or addition of one or more other features, integers, steps, operations, elements, components, and/or groups thereof. The steps, processes, and operations of the method described herein should not be construed as necessarily performing their performance in the particular order discussed or illustrated, unless the order in which they are specifically performed is determined. It should also be understood that additional or alternative steps may be used.

In addition, each component may be implemented as a hardware processor, the above components may be integrated to be implemented as a single hardware processor, or the above components may be combined with each other to be implemented as a plurality of hardware processors.

Hereinafter, preferable embodiments of the present invention will be described in detail with reference to the accompanying drawings.

FIG. 1 is a block diagram illustrating a configuration of a system for reinforcing a multiple-choice QA model based on an adversarial learning technique according to an embodiment of the present invention.

Referring to FIG. 1, a system for reinforcing a multiple-choice QA model according to an embodiment of the present invention can enhance performance by self-learning.

Since artificial intelligence may make erroneous judgments due to weaknesses inherent in algorithms as machines are trained using artificial neural networks, a system for reinforcing a multiple-choice QA model according to an embodiment of the present invention may generate a training data set for training a multiple-choice QA model through an adversarial learning technique.

In general, when there are 4 choices for a question and when there are 10 choices, the difficulty of the question is higher. Accordingly, the system for reinforcing a multiple-choice QA model according to the present invention may increase the number of incorrect answers to be added to the training data set of the multiple-choice QA model to enriching choices, thereby strongly training the multiple-choice QA model.

The system for reinforcing a multiple-choice QA model according to an embodiment of the present invention may, in generating the data set required in the process of training the multiple-choice QA model, construct and simultaneously train not only an incorrect answer generation model 10 but also an incorrect answer test model 20 by considering the characteristics of artificial intelligence that selects the easiest and fastest method in solving a question to improve the quality of the incorrect answer, and based on this, reinforce the multiple-choice QA model.

The incorrect answer generation model 10 according to an embodiment of the present invention may be a device configured to obtain a text based on natural language text and a question from a user, analyze the text and the question, and generate a second incorrect answer based on the context.

The incorrect answer generation model 10 may transmit the generated second incorrect answer to the incorrect answer test model 20, receive feedback for the second incorrect answer from the incorrect answer test model 20, and generate an optimal second incorrect answer through self-learning.

The incorrect answer test model 20 may obtain a text based on natural language text, a question, and a first correct answer (actual correct answer) and a first incorrect answer (actual incorrect answer) for the question, obtain a second incorrect answer generated from the incorrect answer generation model 10, and select a second correct answer from among the first correct answer, the first incorrect answer, and the second incorrect answer by using the text, the question, the first correct answer, the first incorrect answer, and the second incorrect answer as input data. In this case, when the incorrect answer test model 20 selects the second correct answer, the first correct answer, the first incorrect answer, and the second incorrect answer are not distinguished from each other and may simply exist as choices.

The incorrect answer test model 20 may transmit feedback to the incorrect answer generation model 10 based on a result value derived when selecting the second correct answer.

Hereinafter, the incorrect answer generation model 10 and the incorrect answer test model 20 will be described in more detail.

Incorrect Answer Generation Model 10

The incorrect answer generation model 10 is based on a transformer architecture, and may use an SEQ2SEQ model. The incorrect answer generation model 10 is composed of 6 to 24 transformer layers, and each layer may generate a second incorrect answer based on the context of the text and the question received from the user using a linear Softmax classifier at each layer. More specifically, the incorrect answer generation model may include a first receiver 110, a first encoder 120, a question analyzer 130, an incorrect answer generator 140, and a first learning unit 150.

The first receiver 110 may receive a text and a question from a user. The text will have a form of Passage or Dialogue, and the question will be subordinate to the text. The text and the question may be identified by a segment ID.

The first encoder 120 may generate a first text vector and a first question vector by individually encoding the text and the question. The first encoder 120 may be composed of a plurality of encoders and allocated to data processing of the text and question, respectively. Alternatively, the first encoder 120 may be composed of one encoder and allocated to the entire text and question. The first encoder 120 may encode the text and the question in units of morpheme.

The question analyzer 130 may analyze the first question vector based on the first text vector and the first question vector. The question analyzer 130 may use a linear Softmax classifier to analyze the first question vector, and may use known algorithms such as morpheme analysis, syntax analysis, and vocabulary meaning analysis.

The incorrect answer generator 140 may generate an incorrect answer suitable for the context of the text and the question based on the first text vector and the first question vector analyzed by the question analyzer 130.

The first learning unit 150 may train the incorrect answer generator 140 so as to deceive the incorrect answer test model 20 in generating the incorrect answer. More specifically, the first learning unit 150 may train the incorrect answer generator 140 based on a second feedback received from the incorrect answer test model 20.

The first learning unit 150 may improve the performance of the incorrect answer generator 140 by using a cross entropy function. The first learning unit 150 may perform learning to 1) calculate a loss of the incorrect answer generation model 10 based on the text and the question received by the first receiver 110, a first incorrect answer corresponding thereto, and a second incorrect answer generated by the incorrect answer generator 140 and minimize the loss, and 2) calculate a loss of the incorrect answer generation model 10 based on the second feedback received from the incorrect answer test model 20 maximize the loss.

$$\text{Loss}_G = \min\max V(D,G) = \log D(x) + \log(1 - D(G(\text{Input}))) \quad (1)$$

Incorrect Answer Test Model 20

The incorrect answer test model 20 according to an embodiment of the present invention is based on a transformer architecture, and forms a linear layer at the top layer to determine which of the two is the actual correct answer (the second correct answer) based on a second incorrect answer generated from the incorrect answer generation model 10, and the first correct answer, which is the actual correct answer, and the first incorrect answer, which is the actual incorrect answer, for the text and the question received from a user. More specifically, the incorrect answer test model may include a second receiver 210, a second encoder 220, a correct answer selector 230, a feedback generator 240, and a second learning unit 250.

The second receiver 210 may receive a text, a question, and a first correct answer and a first incorrect answer corresponding to the text and the question from the user. In addition, the second receiver 210 may further receive a second incorrect answer generated by the incorrect answer generation model 10 and set the second incorrect answer as a choice for the question.

The text and the question received from the user in the second receiver 210 are identical to the text and the question received from the user by the first receiver 110 of the incorrect answer generation model 10.

The second encoder 220 individually encodes the text, the question, the first correct answer, the first incorrect answer, and the second incorrect answer to generate a second text vector, a second question vector, a first correct answer vector, a first incorrect answer vector, and a second incorrect answer vector. The second encoder may be composed of a plurality of encoders and allocated to data processing of the text, the question, the first correct answer, the first incorrect answer, and the second incorrect answer, respectively. Alternatively, the second encoder may be composed of one encoder and allocated to the whole data received. The second encoder 220 may encode data in units of morphemes when encoding the data.

The correct answer selector 230 may select a second correct answer based on the second text vector, the second question vector, the first correct answer vector, the first incorrect answer vector, and the second incorrect answer vector generated by the second encoder 220. Hereinafter, in the description of the incorrect answer test model 20, the first correct answer vector, the first incorrect answer vector, and the second incorrect answer vector are collectively referred to as a choice vector for intuitive understanding.

The correct answer selector 230 may select the second correct answer vector most suitable for the question from among the choice vectors including the first correct answer vector, the first incorrect answer vector, and the second incorrect answer vector. Specifically, the correct answer selector 230 may analyze how appropriate the choice vectors are for the second text vector and the second question vector and calculate a first score for each of the choice vectors according to a result of analysis. The correct answer selector 230 may analyze how appropriate the choices are for the text and the question by calculating a contextual correlation in the process of analysis. The correct answer selector 230 may use a conventional method to calculate the correlation.

The correct answer selector 230 may set the range of the first score to a range of −10 to 10, which may be changed according to settings. The correct answer selector 230 may calculate the first score as 10 points when the choice vector has a high correlation with the second text vector and the second question vector, and calculate the first score as −10 points when the choice vector has a low correlation.

The correct answer selector 230 may rank the first scores for the choice vectors, and select one choice vector having the highest first score among the ranked first scores as a second correct answer vector.

For example, when one content of the text is "Miseon sent a text to Cheolsu. —Cheolsu, it's Mother's Day today, are you not coming home?—", the question is "What is the relationship between Miseon and Cheolsu?", and choices are 1. Father, 2. Mother, 3. School friend, 4. Homeroom teacher, the correct answer selector 230 may calculate 7 points for the first score of choice 1, 9 points for the first score of choice 2, −8 points for the first score of choice 3, and −3 points for the first score of choice 4. The correct answer selector 230 may identify the gender of Miseon for choice 1 and choice 2 and calculate a first score. The correct answer selector 230 may rank the first scores (choice vector 2, choice vector 1, choice vector 4, choice vector 3) and select the choice vector 2 having the highest first score as the second correct answer vector.

The feedback generator 240 may determine whether the second correct answer vector selected by the correct answer selector 230 is identical to the first correct answer vector. When the first correct answer vector is identical to the second correct answer vector, the feedback generator 240 may generate a positive first feedback to be transmitted to the second learning unit 250, and generate a negative second feedback to be transmitted to the incorrect answer generation model 10. This is because an incorrect answer generated by the incorrect answer generation model 10 is not well made if the incorrect answer test model 20 gets the correct answer.

The second learning unit 250 may train the incorrect answer test model 20 based on the first feedback received from the feedback generator 240. The second learning unit 250 may perform learning such that the correct answer selector 230 selects a second correct answer vector that is identical to the first correct answer vector.

The second learning unit 250 may improve the performance of the correct answer selector 230 by using a cross entropy function. The second learning unit 250 may calculate a loss of the incorrect answer test model 20 based on the first correct answer received from the second receiver 210 and the second correct answer selected by the correct answer selector 230 and perform learning to maximize it.

$$\text{Loss}_D = \max(\log(1-D(G(\text{input})))) \quad (2)$$

BIAS Solution

The system for reinforcing a multiple-choice QA model according to an embodiment of the present invention has a task to solve the problem that the incorrect answer generation model 10 is overfitting in a training process. When the incorrect answer generation model 10 is overfitting, an incorrect answer is generated in a direction to deceive the incorrect answer test model 20. Specifically, an incorrect answer similar to the correct answer is generated such that the incorrect answer test model 20 has difficulties in smoothly selecting the correct answer.

In order to solve this problem, the device for reinforcing a multiple-choice QA model according to an embodiment of the present invention may cause the second learning unit 250 of the incorrect answer test model 20 to perform learning by adjusting weights such that a first score of the second incorrect answer vector generated by the incorrect answer generation model 10 has an intermediate value between a first score of the first correct answer vector and a first score of the first incorrect answer vector.

As another method for solving the problem, the system for reinforcing a multiple-choice QA model according to another embodiment of the present invention may further construct another incorrect answer test model 20 which compares the second incorrect answer generated by the incorrect answer generation model 10 with an actual correct answer (the first correct answer), calculates the similarity therebetween, and transmits a negative feedback to the incorrect answer generation model 10 when the similarity is greater than or equal to a preset threshold. Through this, the incorrect answer generation model 10 will be trained to generate a second incorrect answer that is not very similar to the correct answer. In this case, the additional incorrect answer test model 20 may use an existing model such as TFIDF to calculate the similarity between the second incorrect answer vector and the first correct answer vector.

Figure 2:
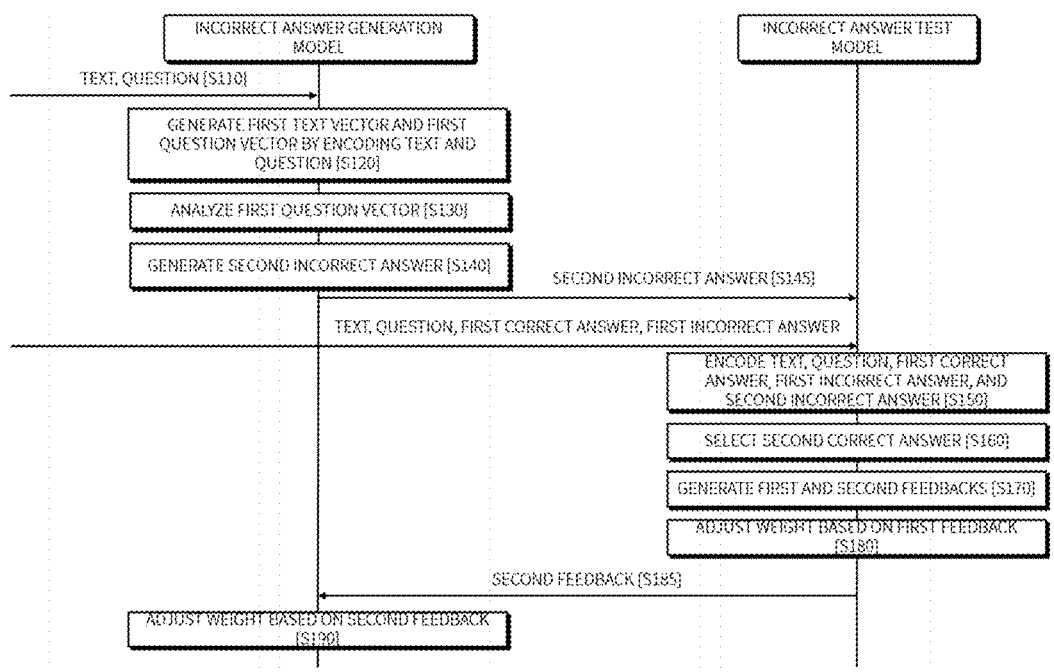
FIG. 2 is a flow chart for describing a method for reinforcing a multiple-choice QA model based on adversarial learning techniques according to an embodiment of the present invention.

FIG. 2 is a flow chart for describing a method for reinforcing a multiple-choice QA model based on an adversarial learning technique according to an embodiment of the present invention. Hereinafter, a method for reinforcing a multiple-choice QA model according to an embodiment of the present invention is described with reference to FIG. 2.

In the related description, detailed embodiments overlapping with the aforementioned system for reinforcing a multiple-choice QA model may be omitted.

The method for reinforcing a multiple-choice QA model of the present invention will be operated by an incorrect answer generation model that generates an incorrect answer and an incorrect answer test model that verifies the incorrect answer generated by the incorrect answer generation model to expand the incorrect answer of a data set for training the multiple-choice QA model.

The incorrect answer generation model 10 may receive a text and a question from a user (S110). The text will have a form of Passage or Dialogue, and the question will be subordinate to the text. The text and the question may be identified by a segment ID.

The incorrect answer generation model 10 may generate a first text vector and a first question vector by individually encoding the text and the question (S120). The incorrect answer generation model 10 may encode the text and the question in units of morpheme.

The incorrect answer generation model 10 may analyze a first question vector based on the first text vector and the first question vector (S130). The incorrect answer generation model 10 may use a linear Softmax classifier to analyze the first question vector, and may use known algorithms such as morpheme analysis, syntax analysis, and vocabulary meaning analysis.

The incorrect answer generation model 10 may generate a second incorrect answer suitable for the context of the text and the question based on the first text vector and the analyzed first question vector (S140).

The incorrect answer generation model 10 may transmit the generated second incorrect answer to the incorrect answer test model 20 (S145).

When receiving the text, the question, the first correct answer and the first incorrect answer from the user and the second incorrect answer from the incorrect answer generation model 10, the incorrect answer test model 20 may individually encode the text, the question, the first correct answer, the first incorrect answer, and the second incorrect answer to generate a second text vector, a second question vector, a first correct answer vector, a first incorrect answer vector, and a second incorrect answer vector (S150). The incorrect answer test model 20 may encode data in units of morphemes when encoding the data.

The incorrect answer test model 20 may select a second correct answer based on the second text vector, the second question vector, the first correct answer vector, the first incorrect answer vector, and the second incorrect answer vector (S160). Hereinafter, in the description of the incorrect answer test model 20, the first correct answer vector, the first incorrect answer vector, and the second incorrect answer vector are collectively referred to as a choice vector for intuitive understanding.

When specifically describing step 160, the incorrect answer test model 20 may select a second correct answer vector most suitable for the question from among the choice vectors including the first correct answer vector, the first incorrect answer vector, and the second incorrect answer vector. Specifically, the incorrect answer test model 20 may analyze how appropriate the choice vectors are for the second text vector and the second question vector, and calculate a first score for each of the choice vectors according to a result of analysis. In the analysis process, the incorrect answer test model 20 may analyze how appropriate the choices are for the text and the question by calculating a contextual correlation in the process of analysis. The incorrect answer test model 20 may use a conventional method to calculate the correlation.

The incorrect answer test model 20 may set the range of the first score to a range of −10 to 10, which may be changed according to settings. The incorrect answer test model 20 may calculate the first score as 10 points when the choice vector has a high correlation with the second text vector and the second question vector, and calculate the first score as −10 points when the choice vector has a low correlation.

The incorrect answer test model 20 may select one choice vector having the highest first score as the second correct answer vector.

The incorrect answer test model 20 may determine whether the second correct answer vector is identical to the first correct answer vector, and generate first and second feedbacks (S170). When the first correct answer vector is identical to the second correct answer vector, the incorrect answer test model 20 may generate a positive first feedback for self-learning, and generate a negative second feedback to be transmitted to the incorrect answer generation model 10. This is because an incorrect answer generated by the incorrect answer generation model 10 is not well made if the incorrect answer test model 20 gets the correct answer.

In selecting the second correct answer based on the first feedback, the incorrect answer test model 20 may adjust a weight to enhance performance (S180). The incorrect answer test model 20 may be trained to select a second correct answer vector that is identical to the first correct answer vector.

When the incorrect answer test model 20 transmits the second feedback to the incorrect answer generation model 10 (S185), the incorrect answer generation model 10 may adjust the weight in generating the second incorrect answer based on the second feedback to improve performance (S190).

Meanwhile, the incorrect answer test model 20 may further perform learning by adjusting weights such that a first score of the second incorrect answer vector generated by the incorrect answer generation model 10 has an intermediate value between a first score of the first correct answer vector and a first score of the first incorrect answer in order to prevent the incorrect answer generation model 10 from overfitting.

As described above, the system for reinforcing a multiple-choice QA model according to an embodiment of the present invention is characterized by generating more incorrect answers among the training data sets of the multiple-choice QA model, so that the generated training data set can be further used to evaluate existing multiple-choice QA models.

According to the present invention as described above, it is possible to enrich the data that can be learned by the multiple-choice QA model by generating more incorrect answers based on a data set used in the process of training the multiple-choice QA model, thus reinforcing a multiple-choice QA model. The multiple-choice QA model trained through the present invention can be further utilized to improve the performance of a search engine.

The embodiments of the present invention disclosed in the present specification and drawings are provided only to provide specific examples to easily describe the technical contents of the present invention and to aid understanding of the present invention, and are not intended to limit the scope of the present invention. It is obvious to those of ordinary skill in the art that other modifications based on the technical idea of the invention can be implemented in addition to the embodiments disclosed therein.

What is claimed is:

1. A method for reinforcing a multiple-choice QA model based on adversarial learning techniques, comprising:

step A of an incorrect answer generation model generating a first text vector and a first question vector by encoding a text based on natural language text and a question, the first correct answer and the first incorrect answer defined by a known answer, the first correct answer and the first incorrect answer are an actual correct answer and an actual incorrect answer to the question, respectively, generating a second incorrect answer suitable for a context of the text and the question based on the first text vector and the first question vector, and transmitting the second incorrect answer to an incorrect answer test model;

step B of the incorrect answer test model encoding the text, the question, the first correct answer corresponding to the text and the question, the first incorrect answer and the second incorrect answer, and selecting a second correct answer based on results of the encoding;

step C of the incorrect answer test model generating a first feedback to train the incorrect answer test model and a second feedback to train the incorrect answer generation model by determining whether the first correct answer is identical to the second correct answer to prevent the incorrect answer generation model from overfitting, wherein the incorrect answer test model comprises a feedback generator and a second learning unit, the first feedback is transmitted from the feedback generator to the second learning unit; and step D of the incorrect answer generation model and the incorrect answer test model performing self-learning based on the second feedback and the first feedback, respectively.

2. The method of claim 1, wherein the step A performed by the incorrect answer generation model, includes:

encoding the text and the question to generate a first text vector and a first question vector, respectively;

analyzing the first question vector and generating a second incorrect answer vector based on the first text vector and the analyzed first question vector; and transmitting a second incorrect answer obtained by decoding the second incorrect answer vector to the incorrect answer test model.

3. The method of claim 1, wherein the step B performed by the incorrect answer test model, includes:

encoding the text, the question, the first correct answer, the first incorrect answer, and the second incorrect answer to generate a second text vector, a second question vector, a first correct answer vector, a first incorrect answer vector, and a second incorrect answer vector, respectively;

calculating first scores through correlation of the first correct answer vector, the first incorrect answer vector, and the second incorrect answer vector, with the second text vector and the second question vector; and selecting a vector having a highest first score among the first correct answer vector, the first incorrect answer vector, and the second incorrect answer vector as a second correct answer vector.

4. The method of claim 3, wherein the step C performed by the incorrect answer test model, includes:

determining whether the first correct answer vector is identical to the second correct answer vector, and, when the first correct answer vector is equal to the second correct answer vector, generating a positive first feedback and generating a negative second feedback;

when the first correct answer vector is not identical to the second correct answer vector, generating a negative first feedback and generating a positive second feedback;

transmitting the generated second feedback to the incorrect answer generation model.

5. The method of claim 4, wherein the step D includes:

adjusting, by the incorrect answer generation model, a weight based on the second feedback to generate a better second incorrect answer; and adjusting, by the incorrect answer test model, the weight based on the first feedback to generate a second correct answer identical to the first correct answer.

6. The method of claim 5, further comprising:

adjusting, by the incorrect answer generation model, the weight to minimize a loss in generating the second incorrect answer using a cross entropy function; and adjusting, by the incorrect answer test model, the weight to maximize a loss in selecting the second correct answer using the cross entropy function.

7. The method of claim 3, wherein the first score of the second incorrect answer vector has an intermediate value between the first score of the first correct answer vector and the first score of the first incorrect answer vector.

8. The method of claim 1, wherein the incorrect answer test model is configured to compare the second incorrect answer with the first correct answer and calculate a similarity therebetween.

9. The method of claim 8, wherein the incorrect answer test model is configured to transmit a negative feedback to the incorrect answer generation model by determining whether the similarity is greater than or equal to a preset threshold.

10. A system for reinforcing a multiple-choice QA model based on adversarial learning techniques, comprising:

a first processor;

a second processor; and a non-transitory memory configured to store instructions executed by at least one of the first processor and the second processor, wherein the first processor executes the instructions to:

generate a first text vector and a first question vector by encoding a text based on natural language text and a question, a first correct answer and a first incorrect answer defined by a known answer, the first correct answer and the first incorrect answer are an actual correct answer and an actual incorrect answer to the question, respectively, generate a second incorrect answer suitable for a context of the text and the question based on the first text vector and the first question vector, receive a second feedback corresponding to the second incorrect answer received from the incorrect answer test model, and adjust a weight; and wherein the second processor executes the instructions to:

encode the text, the question, the first correct answer, the first incorrect answer corresponding to the text and the question, and the second incorrect answer, select a second correct answer based on results of the encoding, generate a first feedback to train the second processor and a the second feedback to train the first processor by determining whether the first correct answer is identical to the second correct answer to prevent the first processor from overfitting, and adjust a weight based on the first feedback;

wherein the incorrect answer test model comprises a feedback generator and a second learning unit, the first feedback is transmitted from the feedback generator to the second learning unit.

11. The system of claim 10, wherein the first processor encodes the text and the question to generate a first text vector and a first question vector, respectively, analyzes the first question vector and generates a second incorrect answer vector based on the first text vector and the analyzed first question vector, and transmits a second incorrect answer obtained by decoding the second incorrect answer vector to the second processor.

12. The system of claim 10, wherein the second processor encodes the text, the question, the first correct answer, the first incorrect answer, and the second incorrect answer to generate a second text vector, a second question vector, a first correct answer vector, a first incorrect answer vector, and a second incorrect answer vector, respectively, calculates first scores through correlation of the first correct answer vector, the first incorrect answer vector, the second incorrect answer vector with the second text vector and the second question vector, and selects a vector having a highest first score among the first correct answer vector, the first incorrect answer vector, and the second incorrect answer vector as a second correct answer vector.

13. The system of claim 12, wherein the second processor determines whether the first correct answer vector is identical to the second correct answer vector, and, when the first correct answer vector is identical to the second correct answer vector, generates a positive first feedback and generates a negative second feedback; when the first correct answer vector is not identical to the second correct answer vector, generates a negative first feedback and generates a positive second feedback, and transmits the generated second feedback to the first processor.

14. The system of claim 13, wherein the first processor adjusts a weight based on the second feedback such that a loss of cross entropy function is minimized to generate a better second incorrect answer, and wherein the second processor adjusts the weight based on the first feedback such that a loss of cross entropy function is maximized to generate a second correct answer identical to the first correct answer.

* * * * *